US006615961B2

(12) United States Patent
Komatsu et al.

(10) Patent No.: US 6,615,961 B2
(45) Date of Patent: Sep. 9, 2003

(54) SEAL CONSTRUCTION OF SHOCK ABSORBER WITH LEVELING FUNCTION

(75) Inventors: Satoshi Komatsu, Kariya (JP); Yukio Hayakawa, Wako (JP); Ryosuke Fujiya, Wako (JP); Kiyoshi Nakahara, Wako (JP)

(73) Assignees: Kayaba Kogyo Kabushiki Kaisha (JP); Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/893,716

(22) Filed: Jun. 28, 2001

(65) Prior Publication Data

US 2002/0014381 A1 Feb. 7, 2002

(30) Foreign Application Priority Data

Jul. 5, 2000 (JP) ........................................ 2000-203565

(51) Int. Cl.$^7$ ................................ F16F 9/36; F16F 9/24
(52) U.S. Cl. ........................... 188/322.16; 188/322.17; 188/297; 277/509
(58) Field of Search ....................... 188/322.16, 322.17, 188/297, 312; 267/DIG. 1, 64.16; 277/509, 508, 557, 927, 926, 605, 645

(56) References Cited

U.S. PATENT DOCUMENTS

| | | | | | |
|---|---|---|---|---|---|
| 2,118,831 A | * | 5/1938 | Wallace | ................. | 188/322.16 |
| 3,054,478 A | * | 9/1962 | Rumsey | ....................... | 188/129 |
| 3,446,318 A | * | 5/1969 | Duckett | ................. | 188/322.17 |
| 3,524,658 A | * | 8/1970 | De Carbon | ............... | 267/64.26 |
| 4,290,511 A | * | 9/1981 | de Baan et al. | ............... | 184/19 |
| 4,386,686 A | * | 6/1983 | Miura | .................... | 188/322.17 |
| 4,667,941 A | * | 5/1987 | Hayashi et al. | ........... | 267/64.16 |
| 5,353,897 A | * | 10/1994 | Woessner | .............. | 188/322.16 |
| 6,105,945 A | * | 8/2000 | Takeuchi et al. | ........ | 188/322.16 |
| 6,182,806 B1 | * | 2/2001 | Hasegawa | .................... | 188/314 |
| 6,244,609 B1 | * | 6/2001 | Wilson | ........................ | 188/312 |

* cited by examiner

Primary Examiner—Jack Lavinder
Assistant Examiner—Robert A. Siconolfi
(74) Attorney, Agent, or Firm—McGlew and Tuttle, P.C.

(57) ABSTRACT

To positively prevent a pressure medium sealed into an outer tube from leaking out from a clearance relative to an oil damper, there is provided a seal construction of a shock absorber 1 with leveling function wherein a seal mechanism 3 is disposed in an outer tube 2 to slidably insert a shock absorber 4 thereinto, a piston rod 5 extending from the shock absorber 4 is connected on the outer tube 2 side, a pressure medium sealed into the outer tube 2 is heated by a heating means 7 and leveling is carried out while controlling the support force exerting on the shock absorber 4, the seal construction being constituted that a free piston 15 is interposed opposite to the seal mechanism 3 between the outer tube 2 and the shock absorber 4, and the seal mechanism 3 and the free piston 15 compart and form a lubricating oil chamber 16 therebetween whereas the free piston 15 is always biased toward the lubricating oil chamber 16.

11 Claims, 2 Drawing Sheets

SEAL CONSTRUCTION OF SHOCK ABSORBER WITH LEVELING FUNCTION

BACKGROUND OF THE INVENTION

The present invention relates to a shock absorber with leveling function making use of gas pressure used in a four wheel car, a two wheeler and so on, and particularly to a seal construction of a shock absorber with leveling function capable of preventing the gas from leaking out.

As a shock absorber with leveling function, there have been already well known one in which an adjusting nut threadedly inserted into an outer peripheral surface of the body or a cam mechanism is used to support one end of a suspension spring, and the adjusting nut or cam mechanism is operated to adjust the spring force of the suspension spring to high or low, during which leveling is carried out mechanically, or the other in which medium pressure within an outer tube which telescopically receives a shock absorber therein is adjusted to high or low to control the support force exerting on the shock absorber whereby leveling is carried out. Particularly, the former is widely employed actually.

In this case, in the latter, it is difficult to allow a seal member for sealing pressure medium to be sealed into an outer tube to have lubricity, failing to have durability of the seal.

SUMMARY OF THE INVENTION

Accordingly, it is an object of the present invention to provide a seal construction of a shock absorber with leveling function capable of improving durability of a seal member for sealing a pressure medium sealed into an outer tube, and capable of preventing the pressure medium from leaking out of a seal present in the shock absorber.

The object of the present invention mentioned above is achieved by a seal construction of a shock absorber with leveling function wherein a seal mechanism is disposed in an outer tube to sidably insert a shock absorber thereinto, a piston rod extending from the shock absorber is connected on the outer tube side, and leveling is carried out while the force of the pressure medium sealed into the outer tube exerting on the shock absorber, the seal construction being constituted that a free piston is interposed opposite to the seal mechanism between the outer tube and the shock absorber, the free piston and the seal mechanism compart and form a lubricating oil chamber therebetween, comprising a bias means for biasing the free piston toward the lubricating oil chamber.

In this case, preferably, a seal element in sliding contact with the outer circumference of the shock absorber is provided on the end on the lubricating oil chamber side of the free piston.

Likewise, preferably, the bias means for urging the free piston comprises a differential pressure spring.

Likewise, preferably, a seal case is connected to an upper end of the outer tube, a seal mechanism comprising a bearing member provided with a seal element in sliding contact with an outer circumference of the shock absorber is provided in an inner circumference at the upper end of the seal case, likewise, a free piston provided with a seal element inwardly of the bearing member is provided internally of the seal case, a differential pressure spring for biasing the free piston upward is provided between a lower part of the seal case and the free piston, and a lubricating oil chamber is comparted between the bearing member and the free piston.

Being constituted as described above, lubricating oil can be supplied to the seal mechanism, and durability of seal is improved. In addition, even if lubricating oil is leaked out, lubricating oil is supplied to the seal mechanism without fail since the free piston is biased.

Further, pressure of lubricating oil sealed into the lubricating oil chamber is always maintained high by a portion of the force by which the free piston presses lubricating oil within the lubricating oil chamber by the biasing force of the bias means, as compared with pressure of the pressure medium within the outer tube comparted with the free piston interposed between the outer tube and the shock absorber.

In this manner, it is possible to positively prevent the pressure medium from leaking out through the lubricating oil chamber located outwardly thereof by always maintaining oil pressure of the lubricating oil chamber high by a portion of predetermined pressure to thereby prevent the pressure medium from being gasified and leaking out from a clearance present in the shock absorber.

DETAILED DESCRIPTION OF THE PREFERRED EMBODIMENT

Figure 1:
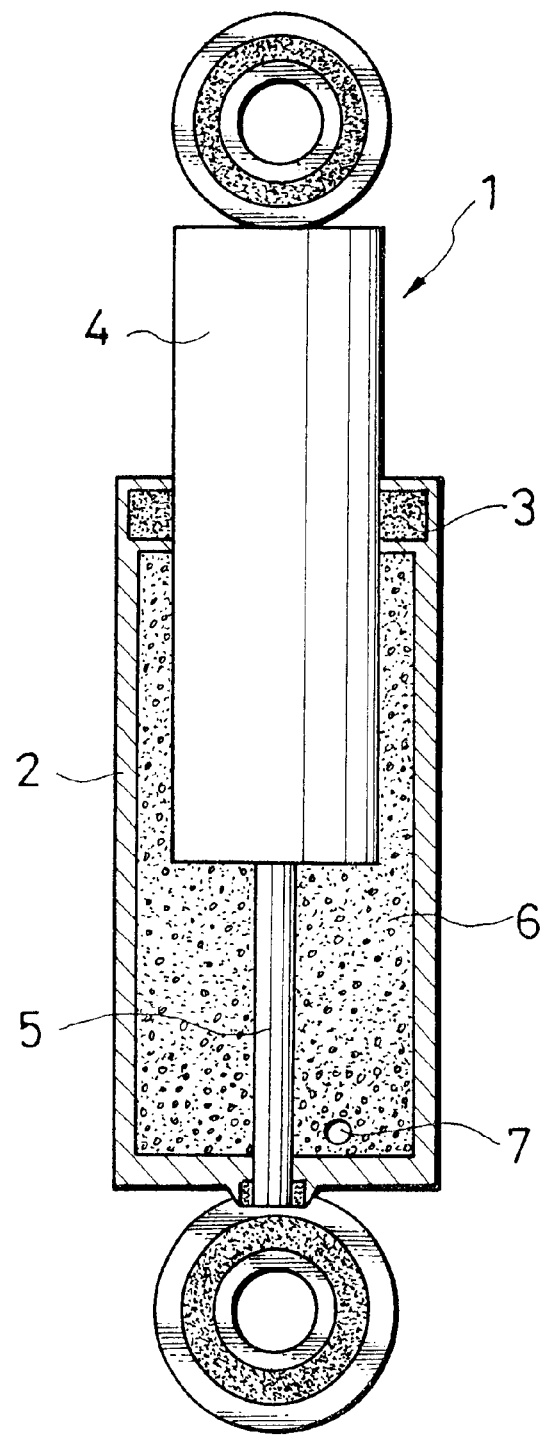
FIG. 1 is an explanatory view for explaining the principle of leveling of a shock absorber with leveling function making use of coolant applied to the present invention.

Prior to explanation of the embodiment according to the present invention, first, the principle of leveling of a shock absorber 1 with leveling function using a pressure medium applied to the invention will be described with reference to FIG. 1, for convenience' sake of explanation.

In the shock absorber 1 with leveling function described above, a seal mechanism 3 is interposed relative to an outer tube 2, a shock absorber 4 is inserted slidably while keeping a handstanding state, a piston rod 5 slidably extending from the shock absorber 4 is connected to the bottom of the outer tube 2.

A coolant 6 such as alternative fleon as a pressure medium which changes in gas-liquid is sealed into the outer tube 2 in a liquid state. The coolant 6 is heated from outside using a heating means 7 such as a heater received in the outer tube 2 to raise pressure of the coolant 6 whereby leveling is carries out while controlling the support force exerting on the shock absorber 4.

When the coolant 6 is sealed into the shock absorber 1 with leveling function of the type as described, the neighborhood of the seal mechanism 3 is in the atmosphere of coolant gas.

Thereby, gas tends to leak from the seal mechanism 3 in the upper portion of the outer tube 2, and there is a possibility that the support force exerting on the shock absorber 4 due to the gas leakage of the coolant 6 from the said portion so lowers that cannot be used.

Figure 2:
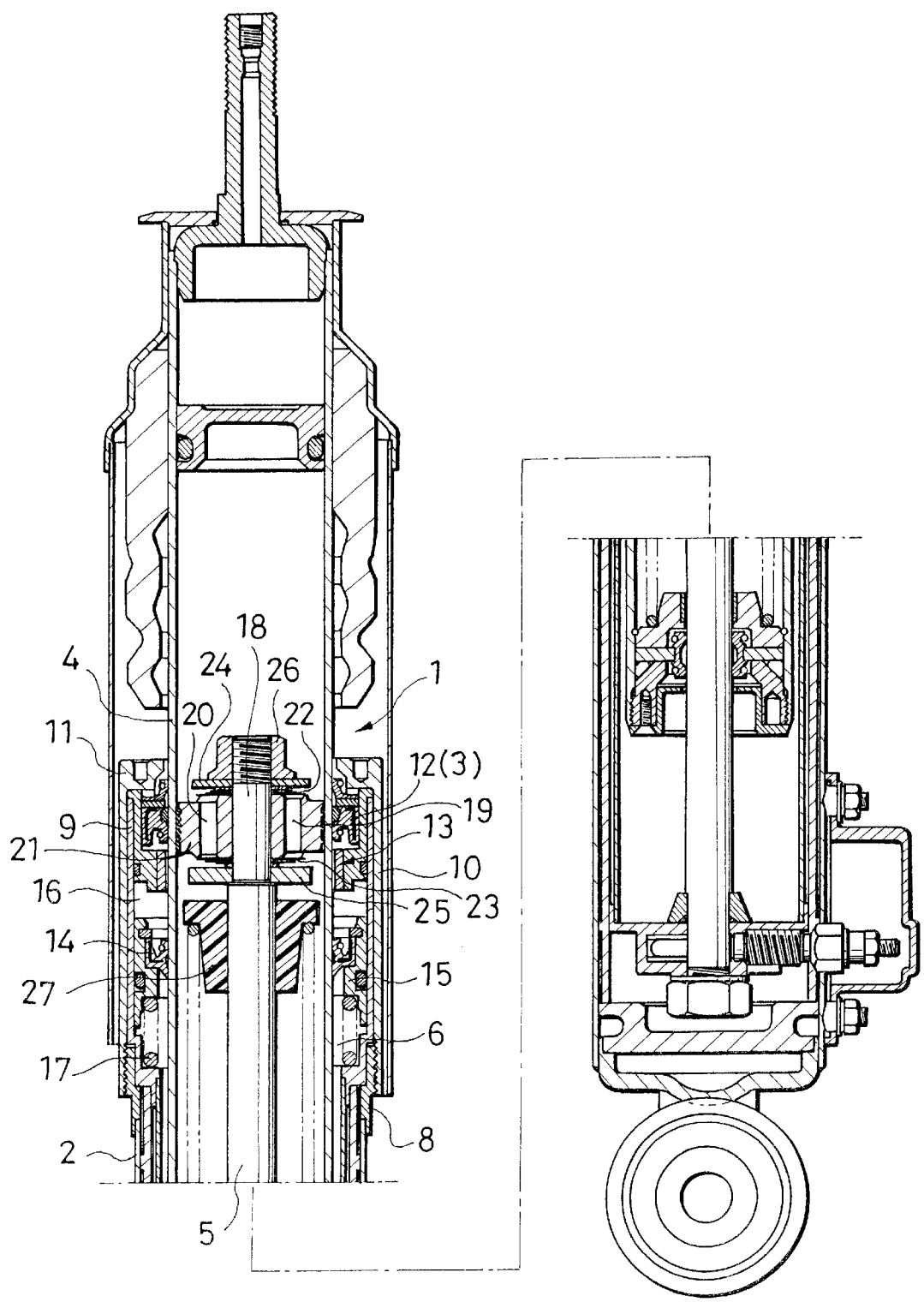
FIG. 2 is likewise a whole longitudinal sectional view showing an embodiment of a shock absorber with leveling function making use of coolant.

FIG. 2 shows a section of main parts of the shock absorber 1 with leveling function according to the present invention taking countermeasures to meet the gas leakage described above. A tube joint 8 is fixedly mounted on the upper end of the outer tube 2 formed into a double construction, and a seal case 9 is fitted over the tube joint 8.

An end tube 10 is fitted from the top of the seal case 9 covering the outer peripheral surface, and the lower end portion of the end tube 10 is screwed to the tube joint 8 whereby a collar 11 at the upper end is hitched and pressed on the upper end surface of the seal case 9, and the seal case 9 is fitted in and secured to the upper end of the tube joint 8.

A bearing member 13 provided with a seal element 12 for sealing oil and dust from a sliding contact part relative to the shock absorber 4 is disposed in the inner peripheral surface in the upper end portion of the seal case 9, a free piston 15 provided with a seal element 14 likewise with respect to oil located at a portion inwardly of the bearing member 13 is disposed, a lubricating oil chamber 16 is comparted between the shock absorber 4 and the seal case 9 by the bearing member 13 and the free piston 15, and the lubricating oil chamber 16 is filled with lubricating oil.

On the other hand, a differential pressure spring 17 is interposed between the seal case 9 and the free piston 15, and in addition to the coolant 6 sealed in and between the outer tube 2 and the shock absorber 4, even the differential pressure spring 17 pushes up the free piston 15 to apply the force to the lubricating oil chamber 16 whereby the pressure of lubricating oil in the lubricating oil chamber 16 is always maintained high as compared with the coolant 6 in the outer tube 2 by a portion of the force by the differential pressure spring 17.

Accordingly, the lubricating oil is to be supplied always to the portion of the seal element 12 by the aforesaid pressure.

While hereupon, there is used the shock absorber 4 of the type in which a piston 21 having oil ports 19, 20 of extensional pressure and attenuation valves 22, 23 and valve stoppers 24, 25 of extensional pressure are secured to a small diameter part 18 provided at the end of the piston rod 5 by means of a piston nut 26, and an extensional stopper 27 is secured to the piston rod 5 away in suitable dimension from the valve stopper 25, it is noted that the shock absorber of the type as described need not be used necessarily but other well known shock absorbers of various types may be used to connect one end of the piston rod to the outer tube 2 side.

Further, while in the present embodiment, the coolant 6 is heated by the heating means 7 to control the support force exerting on the shock absorber 4 while raising pressure, thus carrying out leveling, it is noted that pressure of the pressure medium can be raised by a pump or the like, without using the heating means 7 as described, to carry out leveling.

Being constituted as described above, pressure of lubricating oil sealed into the lubricating oil chamber 16 is always maintained high by a portion of the force by which the free piston 15 presses lubricating oil in the lubricating oil chamber 16 by the restoring force of the differential pressure spring 17, that is, a portion of pressure to be added by the restoring force of the differential pressure spring, as compared with pressure of the pressure medium in the outer tube 2 comparted with the free piston 15 interposed between the outer tube 2 and the shock absorber 4.

On the other hand, the coolant 6 sealed into the outer tube 2 is partly gasified and stayed as gas in the lower part of the free piston 15, but even if a part of the coolant 6 is gasified and stayed as gas at the upper area in the outer tube 2, the lubricating oil pressure of the lubricating oil chamber 16 present above the pressure medium with the free piston 15 put therebetween is high without fail by a portion of pressure caused by the restoring force of the differential pressure spring 17.

Therefore, even if a part of the coolant 6 is gasified and stayed as gas at the upper area in the outer tube 2, the gasified coolant 6 are prevented positively from leaking out through the lubricating oil chamber 16 present thereabove by always maintaining oil pressure of the lubricating oil chamber 16 high by a portion of predetermined pressure, and the coolant 6 is to be prevented from being gasified and leaking out from a clearance relative to the shock absorber 4, while using the coolant 6 as the pressure medium sealed into the outer tube 2.

As described above, according to the invention of claim 1, there is provided a seal construction of a shock absorber with leveling function wherein a seal mechanism is disposed in an outer tube to slidably insert a shock absorber thereinto, a piston rod extending from the shock absorber is connected on the outer tube side, and leveling is carried out while the force of the pressure medium sealed into the outer tube exerting on the shock absorber, the seal construction being constituted that a free piston is interposed opposite to the seal mechanism between the outer tube and the shock absorber, the free piston and the seal mechanism compart and form a lubricating oil chamber therebetween, comprising a bias means for biasing the free piston toward the lubricating oil chamber. Thereby, pressure of lubricating oil sealed into the lubricating oil chamber is always maintained high by a portion of the force by which the free piston presses lubricating oil by the bias means, as compared with pressure of the pressure medium in the outer tube comparted with the free piston interposed between the outer tube and the shock absorber.

Thereby, lubricating oil can be supplied to the seal mechanism without fail, and not only the durability of the seal mechanism can be improved, but also even if the lower part of the free piston is in the gaseous atmosphere due to the pressure medium sealed into the outer tube, it is possible to prevent the pressure medium from leaking out through the lubricating oil chamber by always maintaining the oil pressure of the lubricating oil chamber high by a part of predetermined pressure, thus enabling effectively preventing the pressure medium sealed into the outer tube from leaking out from a clearance relative to the shock absorber.

What is claimed is:

1. A seal construction of a shock absorber with leveling function wherein a shock absorber main body is slidably inserted in an outer tube through a seal mechanism, a piston rod extending from the shock absorber main body is connected to the outer tube, a pressure medium is sealed in the outer tube, and the force of the pressure medium exerted on the shock absorber main body is controlled for leveling, said seal construction of the shock absorber with leveling function comprising:

a free piston slidably interposed opposite to the seal mechanism between an inner circumference of the outer tube and an outer circumference of the shock absorber main body, said free piston forming an lubricating oil chamber on the opposite side of the pressure medium between the seal mechanism and the free piston; and a bias means biasing the free piston against the lubricating oil chamber, said bias means being provided in the outer tube on the side of the pressure medium.

2. A seal construction of a shock absorber with leveling function according to claim 1, wherein a seal element and an O-ring are in sliding contact with an outer circumference of the shock absorber main body and an inner circumference of the outer tube, respectively, are provided on an inner circumference of the free piston and on an outer circumference thereof.

3. A seal construction of a shock absorber with leveling function according to claim 1, wherein the bias means biasing the free piston is a differential pressure spring.

4. A seal construction of a shock absorber with leveling function according to claim 1, wherein a seal case is provided on an upper inner circumference of the outer tube, the seal mechanism comprising a bearing member provided with a seal element which is in sliding contact with an outer circumference of the shock absorber main body at the upper end of the seal case, the free piston provided with the seal element and the O-ring below the bearing member is slidably provided internally of the seal case, said free piston forming the lubricating oil chamber between the bearing member and the free piston and sealing the pressure medium on the lower opposite side of the lubricating oil chamber, and the differential pressure spring biasing the free piston against the side of the lubricating oil chamber is provided between a lower part of the seal case and a lower part of the free piston.

5. A leveling shock absorber arrangement comprising:

a shock absorber body;

an outer tube arranged slidably around said shock absorber body;

a pressure medium arranged between said shock absorber body and said outer tube;

a first seal arranged between said shock absorber body and said outer tube, said first seal holding said pressure medium between said shock absorber body and said outer tube;

a second seal arranged between said shock absorber body and said outer tube, said second seal being spaced from said first seal and on a diametrically opposite of said first seal from said pressure medium, said and second seals define a sealing fluid chamber between said first and second seals;

sealing fluid arranged in said sealing fluid chamber;

a bias spring biasing said first seal toward said second seal.

6. An arrangement in accordance with claim 5, wherein:

said first seal is slidably arranged along said shock absorber body and said outer tube.

7. An arrangement in accordance with claim 5, wherein:

said first seal is biased toward said second seal by a pressure of said pressure medium.

8. An arrangement in accordance with claim 5, wherein:

force from said pressure medium, on said first seal pressurizes said sealing fluid in said sealing fluid chamber.

9. An arrangement in accordance with claim 5, wherein:

pressurization of said sealing fluid in said sealing fluid chamber increases sealing of said pressure medium by first seal;

said sealing fluid is a liquid.

10. An arrangement in accordance with claim 6, wherein:

said first seal is biased toward said second seal by a pressure of said pressure medium;

force from said pressure medium on said first seal pressurizes said sealing fluid in said sealing fluid chamber;

pressurization of said sealing fluid in said sealing fluid chamber increases sealing of said pressure medium by first seal;

said sealing fluid is a liquid.

11. An arrangement in accordance with claim 5, wherein:

said bias spring biases said first seal toward said second seal with respect to said outer tube;

a shock absorber piston rod slidably extends from one end of said shock absorber body and is connected to said outer tube.

\* \* \* \* \*